United States Patent [19]

Imada et al.

[11] 4,311,828

[45] Jan. 19, 1982

[54] METHOD FOR MODIFYING SURFACE PROPERTIES OF SHAPED ARTICLES OF POLYMERIC MATERIALS WITH LOW TEMPERATURE PLASMA

[75] Inventors: Kiyoshi Imada, Omiya; Susumu Ueno, Ibaraki; Yasuhide Nishina, Ibaraki; Hirokazu Nomura, Ibaraki, all of Japan

[73] Assignee: Shin-Etsu Chemical Co., Ltd., Tokyo, Japan

[21] Appl. No.: 169,396

[22] Filed: Jul. 16, 1980

[30] Foreign Application Priority Data

Jul. 16, 1979 [JP] Japan .................................. 54-90220

[51] Int. Cl.$^3$ .............................................. C08F 6/00
[52] U.S. Cl. .................................. 528/483; 204/165; 525/388
[58] Field of Search ..................... 528/483; 204/165

[56] References Cited

U.S. PATENT DOCUMENTS

| | | | |
|---|---|---|---|
| 4,049,897 | 9/1977 | Houslay | 528/483 |
| 4,107,421 | 8/1978 | Scamehorn et al. | 528/483 |
| 4,220,754 | 9/1980 | Feldman | 528/483 |
| 4,247,440 | 1/1981 | Asai et al. | 528/483 |

*Primary Examiner*—Lorenzo B. Hayes
*Assistant Examiner*—Amelia B. Yarbrough
*Attorney, Agent, or Firm*—Toren, McGeady & Stanger

[57] ABSTRACT

The invention provides a novel method for modifying surface properties, e.g. liability to surface bleeding of plasticizers and other additives and affinity with water, of shaped articles of polymeric materials such as vinyl chloride-based resins and silicone rubbers by the treatment with low temperature plasma of a gas. The plasma treatment in the inventive method is carried out in two steps with the first step carried out in an atmosphere of oxygen and the second step carried out in a non-oxidizing gas such as argon and carbon monoxide. Different from the conventional methods of plasma treatment which suffer from poor reproducibility and low effectiveness, the inventive method can give good reproducibility and high effectiveness presumably owing to the removal of the surface stain in the first step plasma treatment.

2 Claims, No Drawings

METHOD FOR MODIFYING SURFACE PROPERTIES OF SHAPED ARTICLES OF POLYMERIC MATERIALS WITH LOW TEMPERATURE PLASMA

BACKGROUND OF THE INVENTION

The present invention relates to a method for modifying surface properties of a shaped article of a polymeric material such as a vinyl chloride-based resin or a silicone rubber or, more particularly, to a method for reducing the bleeding phenomenon of plasticizers or other additive ingredients on the surface of the shaped article or for increasing the affinity of the surface to water by the treatment of the surface with low temperature plasma.

Needless to say, vinyl chloride-based resins belong to one of the most important classes of thermoplastic resins owing to their excellent and very versatile properties along with their relative inexpensiveness so that they are widely employed in a variety of application fields as shaped in various articles. In particular, rigidity or flexibility of shaped articles of vinyl chloride-based resins can be adequately controlled by formulating the resin with a plasticizer. The thus plasticized resins can give relatively flexible shaped articles so that plasticized resin compositions are fabricated into films, sheets, synthetic leathers, tubes, hoses, bags, coating materials and the like used in various fields such as medical instruments, packaging materials for foodstuffs, materials for agricultural use, building materials and the like.

Furthermore, it is a very common practice that vinyl chloride-based resins are formulated with various kinds of additive ingredients such as flame retardants, antioxidants, ultraviolet absorbers, lubricants and others according to the particular needs for the improvements of the workability of the resin composition as well as the properties of the articles shaped with the resin composition.

One of the most serious problems in these articles shaped not only with vinyl chloride-based resins but also with the other kinds of plastic polymers as well as in shaped articles of rubbery elastomers such as silicone rubbers formulated with the additive ingredients, typically, a plasticizer, is that the plasticizer contained in the shaped article may sometimes migrate toward the surface of the article and exude on the surface of the article in the long run resulting in inferior properties of the articles. This phenomenon is usually called "bleeding", prevention of which is one of the most important problems difficult to solve in the technology of synthetic resin and rubber processing.

Bleeding of the plasticizer and other additives is undesirable not only due to the deterioration of the properties of the shaped articles but also due to the transfer of the additives exuded on the surface of an article to the surface of the other body being in contact with the shaped article in question.

Along with the loss in the beauty of the surface appearance of the articles, bleeding or transfer of the additives is especially undesirable when the shaped article is used in a medical instrument or in contact with foods because safety of the exuded additives to the human health is not established in general so that the use of these plastic resins and rubbers in these fields is sometimes largely limited.

Various attempts have been made to solve the above described problem of surface bleeding of plasticizers and other additives. The methods hitherto proposed for the purpose include a method of treatment or irradiation of the surface of the articles with ionizing radiation, high-energy electron beams or ultraviolet light, a method of providing coating films on the surface of the articles with a suitable synthetic resin capable of preventing surface bleeding of the additives and a method of chemical treatment in which certain special chemicals are applied on to the surface of the articles or admixed in the composition of the resin or rubber for shaping the articles. These methods are, however, not satisfactory in most cases in the effectiveness with, instead, an adverse effect of impairing several advantageous properties inherently possessed by the resin or rubber per se.

For example, irradiation with ionizing radiation or high-energy electron beams may produce crosslinking between the polymer molecules not only in the superficial layer of the shaped article but also in the subsurface layer due to the excessively high energy of the radiation so that the flexibility of the articles is largely lost. Treatment with ultraviolet light is sometimes undesirable by the reason of coloring in the surface depending on the kind of polymer due to the degradation of the polymer molecules in the surface layer of the shaped article. The chemical means is not free from the problem of surface erosion of the shaped articles and the poor adhesivity and durability of the films provided on the surface of the article.

Another serious problem in the shaped articles of polymeric materials is the poor affinity of the surface with water. This nature of the polymer surface is especially detrimental when the article is to be used in contact with aqueous liquids such as the medical instruments used in contact with the body fluids. The affinity of the surface with water can be increased, of course, by treating the surface with surface active agents or by incorporating like compounds into the polymeric material before shaping into articles. Application of these methods is, however, limited because of the low durability of the effect or the adverse effects on the properties of the shaped articles.

Recently, it has been proposed that the surface bleeding of plasticizer and other additives in a shaped article of several kinds of resins and rubbers can be prevented by exposing the article to an atmosphere of low temperature plasma of a gas such as rare gases, oxygen, nitrogen, carbon monoxide and the like of low pressure generated by glow discharge. This method of plasma treatment is effective for preventing migration and surface bleeding of the additives by the formation of highly crosslinked layer only in the very surface of the article without affecting the desirable properties of the article as a bulk. It has been shown by the inventors that the plasma treatment of shaped articles of resins and rubbers is also effective in improving the wettability, adhesivity and printability as well as in reducing electrostatic charging and surface stain.

Despite the remarkable effectiveness of the plasma treatment with the above described object, the method sometimes suffers from poor reproducibility of the results for an unknown reason presenting a great drawback to the practical application of the method.

SUMMARY OF THE INVENTION

It is therefore an object of the present invention to provide a novel method for the modification of the surface properties of a shaped article of a polymeric material, i.e. resins and rubbers, by the treatment with low temperature plasma so as that bleeding of the plasticizer and other additives contained in the article on to the surface can be very effectively prevented with a high reproducibility irrespective of the surface condition of the articles.

Thus, the inventive method for the modification of the surface properties of a shaped article of a polymeric material comprises the steps of (a) subjecting the surface of the shaped article to a first exposure to an atmosphere of low temperature plasma of a gas which is oxygen or a gaseous mixture containing at least 50% by volume of oxygen, and (b) subjecting the surface of the shaped article after the first exposure above to a second exposure to an atmosphere of low temperature plasma of a gas which is a gas other than oxygen or a gaseous mixture containing not exceeding 50% by volume of oxygen.

DETAILED DESCRIPTION OF THE PREFERRED EMBODIMENTS

The inventors have conducted extensive investigation with an object to find the reason for the above mentioned poor reproducibility in the effect of plasma treatment and arrived at a conclusion that the principal reason for the poor reproducibility is the uncontrollable surface stain of the shaped articles with certain low molecular weight substances which may be the exuded plasticizer in the case of a plasticized polyvinyl chloride resin article or a low molecular weight organopolysiloxane in the case of a silicone rubber unavoidably containing such a low molecular weight organopolysiloxane as well as other foreign materials depositing on the surface.

By further investigation undertaken to find an effective means to remove the surface stain of the shaped articles whereby to ensure good reproducibility in the effect of plasma treatment, the inventors have arrived at a discovery that the most convenient and effective method for the removal of the surface stain is a pretreatment of the surface with low temperature plasma of a gas having oxidative power such as oxygen or an oxygen-containing gaseous mixture followed by the plasma treatment in an atmosphere of a gas other than oxygen. The method of the invention is so effective that the same principle is applicable to almost all kinds of polymeric materials including natural, semi-synthetic and synthetic resins and rubbers. The shape of the article is also not limitative in so far as a uniform effect of the plasma treatment is obtained in the first and the second exposure to the low temperature plasma.

The reason for the high reproducibility in the effect of the plasma treatment obtained by the inventive method is presumably the oxidative decomposition of the surface stain material to be cleaned up in the first step of plasma treatment in an oxygen atmosphere to facilitate the activated species of the plasma atmosphere in the second step to directly reach the genuine surface of the shaped article without an obstacle by the surface stain material.

The first step of the inventive method is the exposure of the surface of the shaped article to an atmosphere of low temperature plasma of a gas having oxidative power. The gas having oxidative power is preferably oxygen but a gaseous mixture containing, for example, 50% by volume or larger of oxygen is also suitable for the purpose. When the oxygen partial pressure is smaller than 50% of the total pressure of the atmosphere, no desired effect of surface cleaning is obtained.

The low temperature plasma of a gas is obtained by the electric discharge through an atmosphere of the gas under a pressure of 0.001 to 10 Torr or, preferably, 0.01 to 1 Torr with supply of an electric power of 10 to 10,000 watts to the electrodes of the apparatus. The frequency of the electric power supply is not limitative and may be direct current, low frequency or high frequency up to microwave range but most conveniently a frequency of 13.56 MHz is recommended. The mode of discharge can be corona discharge, spark discharge or silent discharge in addition to the preferred glow discharge. The disposition of the electrodes is also not limitative including inside electrodes and exterior electrodes as well as a coil electrode connected to the high frequency generator by capacitive coupling or inductive coupling. In any way, care must be taken that the article under treatment is not adversely affected by the heat of electric discharge bringing about denaturation of the surface of the article.

The length of time for the treatment of this first exposure to low temperature plasma is largely subject to variation depending on various factors such as the kind of the polymeric material, additives contained therein and conditions of the surface stain as well as the conditions of the plasma atmosphere. Therefore, it is a recommended practice that the length of time for this first step is determined in advance by a preliminary test with one or a few of the samples belonging to the lot in question. Usually a time of several tens of seconds to several tens of minutes is sufficient to obtain the desired effect of surface cleaning. An excessively long time of the plasma treatment is undesirable in this first step with the oxygen atmosphere, presumably, due to the oxidative degradation of the polymer in the surface layer.

The next step of the inventive method is the treatment of the shaped article with low temperature plasma of a gas which is preferably non-oxidizing. Such a non-oxidizing gas is exemplified by helium, neon, argon, nitrogen, nitrous oxide, nitrogen dioxide, carbon monoxide, carbon dioxide, hydrogen, chlorine, hydrogen chloride, sulfur dioxide and hydrogen sulfide. These gases are used either singly or as a mixture of two kinds or more. Preferred gases are carbon monoxide and argon as well as mixtures of them. Although not critical, oxygen or other oxidizing gases should be excluded from the atmosphere in this second plasma treatment as far as possible.

The conditions for the plasma treatment in this second step are much the same as in the first step and need not be repeated in detail here. It should be noted that the plasma treatment of the second step may not necessarily follow the first step immediately after completion of the first step treatment but it is recommended that the second step treatment is undertaken within about 24 hours after the end of the first step treatment in order to avoid possible re-contamination of the surface.

Following are the examples to illustrate the effects of the inventive method with respect to prevention of the plasticizer bleeding on the surface of a plasticized polyvinyl chloride resin article and enhancement of the wettability of a silicone rubber surface with water.

EXAMPLE 1

A composition composed of 100 parts by weight of a homopolymeric polyvinyl chloride resin having an average degree of polymerization of about 1300 (TK- 1300, a product by Shin-Etsu Chemical Co., Japan), 50 parts by weight of dioctyl phthalate, 0.5 part by weight of a non-fogging agent (Rikemal 300, a product by Riken Vitamin Oil Co., Japan), 1.5 parts by weight of calcium stearate and 1.5 parts by weight of zinc stearate was milled in a roller at 160° C. for 10 minutes and shaped by compression molding at 165° C. into sheets of 0.5 mm thickness.

After 1 month from the preparation of the sheets, it was noticed that the surface of the sheets was contaminated with exuded material indicating the surface bleeding of the liquid additives in the sheet.

The sheets thus surface-stained were each subjected to the plasma treatment by placing it in a plasma generating apparatus and generating low temperature plasma in the plasma chamber by the electric discharge with application of a 150 watts high frequency electric power at 13.56 MHz under a pressure of 0.4 Torr. The kind of the gases in the plasma atmosphere and the length of time of the plasma treatment were varied as shown in Table 1 below. In Experiment No. 3 in which two-step plasma treatment was undertaken in accordance with the invention, the gas supply was switched from oxygen in the first step to carbon monoxide in the second step immediately after the end of 10 minutes for the first step treatment and plasma discharge was continued.

The thus plasma-treated sheets as well as the sheet before plasma treatment were examined for the amount of the plasticizer bleeding on the surface by extraction with a solvent. Thus, the sheet was placed on the bottom of a cylindrical extraction vessel of 100 ml capacity and 50 ml of n-hexane was introduced into the vessel so as that 26 cm$^2$ surface area of the sheet was contacted with the solvent followed by shaking the vessel at 37° C. for 2 hours and determination of dioctyl phthalate in the n-hexane extract by gas chromatography. The results of this extraction test were as shown in Table 1.

TABLE 1

| Experiment No. | Plasma treatment length of time/gas in the atmosphere | Dioctyl phthalate extracted, mg |
| --- | --- | --- |
| 1 | Not treated | 124 |
| 2 | 10 minutes/carbon monoxide | 26 |
| 3 | 10 minutes/oxygen + 10 minutes/carbon monoxide | 1.04 |
| 4 | 20 minutes/carbon monoxide | 16 |
| 5 | 20 minutes/oxygen | 36 |

EXAMPLE 2

Electroconductive silicone rubber sheets of 0.5 mm thickness were prepared by the compression molding of a silicone rubber compound composed of 100 parts by weight of a diorganopolysiloxane gum containing methyl and vinyl groups as the organic groups, of which the amount of the vinyl groups was 0.15% by moles of the total organic groups, 60 parts by weight of acetylene black and 0.7 part by weight of dicumyl peroxide.

These silicone rubber sheets were each subjected to the treatment with low temperature plasma under substantially the same conditions as in Example 1 with varied kinds of the atmospheric gas as indicated in Table 2 below. The electric power for the discharge was 150 watts for the atmospheric gas of oxygen or carbon monoxide and 250 watts for the atmospheric gas of argon.

The contact angle of water on the surface of these plasma-treated silicone rubber sheets was determined just after the plasma treatment or after lapse of 1, 3 and 6 months. The results are shown in Table 2 together with the results of the sheet without plasma treatment.

TABLE 2

| | Contact angle of water | | | |
| --- | --- | --- | --- | --- |
| Plasma treatment, length of time/gas in the atmosphere | As plasma-treated | After 1 month | After 3 months | After 6 months |
| Not treated | 95° | 95° | 97° | 98° |
| 20 minutes/carbon monoxide | 45° | 69° | 78° | 93° |
| 10 minutes/oxygen + 10 minutes/carbon monoxide | 33° | 40° | 46° | 50° |
| 20 minutes/argon | 42° | 66° | 90° | 95° |
| 10 minutes/oxygen + 10 minutes/argon | 28° | 32° | 35° | 40° |

What is claimed is:

1. A method for the modification of the surface properties of a shaped article of a polymeric material which comprises the steps of
   (a) subjecting the surface of the shaped article to a first exposure to an atmosphere of low temperature plasma of an oxidizing gas selected from the group consisting of oxygen and gaseous mixtures containing 50% by volume or more of oxygen, and then
   (b) subjecting the surface of the shaped article to a second exposure to an atmosphere of low temperature plasma of a non-oxidizing gas selected from the group consisting of helium, neon, argon, nitrogen, nitrous oxide, nitrogen dioxide, carbon monoxide, carbon dioxide, hydrogen, chlorine, hydrogen chloride, sulfur dioxide and hydrogen sulfide wherein said low temperature plasma of a gas is obtained by the electric discharge through an atmosphere of the gas under a pressure of 0.001 to 10 Torr.

2. The method as claimed in claim 1 wherein the non-oxidizing gas in the step (b) is argon or carbon monoxide.

* * * * *